US012581144B2

(12) United States Patent
Thacker et al.

(10) Patent No.: US 12,581,144 B2
(45) Date of Patent: Mar. 17, 2026

(54) METHOD OF PROVIDING A TIME-SYNCHRONIZED MULTI-STREAM DATA TRANSMISSION

(71) Applicant: Mobii Systems (Pty) Ltd, Cape Town (ZA)

(72) Inventors: Michael Don Thacker, Durbanville (ZA); Brendan Barrett, Durbanville (ZA)

(73) Assignee: Mobii Systems (Pty) Ltd, Cape Town (ZA)

( * ) Notice: Subject to any disclaimer, the term of this patent is extended or adjusted under 35 U.S.C. 154(b) by 37 days.

(21) Appl. No.: 18/279,696

(22) PCT Filed: Mar. 2, 2022

(86) PCT No.: PCT/ZA2022/050010
§ 371 (c)(1),
(2) Date: Sep. 1, 2023

(87) PCT Pub. No.: WO2022/187876
PCT Pub. Date: Sep. 9, 2022

(65) Prior Publication Data
US 2024/0171792 A1     May 23, 2024

(30) Foreign Application Priority Data
Mar. 4, 2021     (ZA) ................................. 2021/01483

(51) Int. Cl.
*H04N 21/242*     (2011.01)
*H04N 5/04*     (2006.01)
(Continued)

(52) U.S. Cl.
CPC ............. *H04N 21/242* (2013.01); *H04N 5/04* (2013.01); *H04N 21/23605* (2013.01);
(Continued)

(58) Field of Classification Search
CPC ........... H04N 21/242; H04N 21/23605; H04N 21/4307; H04N 21/4305; H04N 21/8547
See application file for complete search history.

(56) References Cited

U.S. PATENT DOCUMENTS 10,264,070 B2 *   4/2019   Bradley .............. H04L 67/1095
10,609,431 B2 *   3/2020   Lindgren .............. H04L 65/611
(Continued)

OTHER PUBLICATIONS

"International Search Report and Written Opinion", issued in International Patent Application No. PCT/ZA2022/050010 on Aug. 18, 2022.

*Primary Examiner* — Pinkal R Chokshi
(74) *Attorney, Agent, or Firm* — Billion & Armitage

(57) ABSTRACT

A method of providing a time-synchronized multi-stream data transmission includes the steps of: (i) providing a first recording or generating device for providing frames of a first data stream; (ii) encoding the first data stream into packets, wherein each first data stream packet includes a presentation time and a predetermined number of first data stream frames; (iii) providing a second recording or generating device for providing frames of a second data stream; (iv) encoding the second data stream into packets, wherein each second data stream packet includes a presentation time and a predetermined number of second data stream frames; (v) transmitting the first and second data streams to a processing device; (vi) associating a start reference time with the first packet of the first and second data streams transmitted; (vii) assigning a first stream start time to the first packet of the first data stream transmitted and a second stream start time to the first packet of the second data stream transmitted; (viii) associating a first time offset from the start reference time and first data stream start time (either directly or indirectly) with each subsequent packet of the first data stream and associating a second time offset from the start (Continued)

reference time and second data stream start time (either directly or indirectly) with each subsequent packet of the second data stream; (ix) time-aligning the first data stream packets with the second data stream packets using the first time offset associated with the first data stream and using the second time offset associated with the second data stream; and (x) applying a common presentation time to the aligned first and second data stream packets, irrespective of the original presentation time of the first and second data streams.

16 Claims, 5 Drawing Sheets

(51) Int. Cl.
| | |
|---|---|
| *H04N 21/236* | (2011.01) |
| *H04N 21/43* | (2011.01) |
| *H04N 21/8547* | (2011.01) |

(52) U.S. Cl.
CPC ..... *H04N 21/4305* (2013.01); *H04N 21/4307* (2013.01); *H04N 21/8547* (2013.01)

(56) References Cited

U.S. PATENT DOCUMENTS

| | | | | |
|---|---|---|---|---|
| 11,317,035 B1* | 4/2022 | McLennan | ......... | H04N 21/4307 |
| 2007/0183462 A1* | 8/2007 | Daugherty | ........... | H04J 3/0629 |
| | | | | 370/516 |
| 2012/0128061 A1* | 5/2012 | Labrozzi | ........... | H04N 21/8456 |
| | | | | 375/E7.126 |
| 2015/0052571 A1* | 2/2015 | Stokking | ........... | H04N 21/8547 |
| | | | | 725/116 |
| 2016/0234542 A1* | 8/2016 | Stokking | .............. | H04N 21/242 |
| 2017/0006331 A1* | 1/2017 | Jairath | .............. | H04N 21/4305 |
| 2018/0035019 A1* | 2/2018 | Back | ................... | H04L 7/0075 |
| 2018/0352274 A1* | 12/2018 | Pantos | .............. | H04N 21/4305 |

* cited by examiner

112

114

116

120

METHOD OF PROVIDING A TIME-SYNCHRONIZED MULTI-STREAM DATA TRANSMISSION

BACKGROUND

The present invention relates to a method of providing a time-synchronized multi-stream data transmission. More particularly, the present invention relates to a method of providing a multi-stream data transmission in which: each data stream is encoded into packets; a common start reference time is assigned to each data stream; and a time offset with reference to the start reference time is assigned to each packet of each data stream before being transmitted to a remote device for display.

Various methods for transmitting multi-stream data are known. However, standard video players play a video data stream based on the presentation time in the packets of the video data stream. Typically, in a live stream broadcast, the video player would adjust an offset with respect to the current time of day and the presentation time in order for the video player to play the live video data stream. This becomes challenging when trying to view multiple and simultaneous video data streams, as the video player would require additional control and complexity to align each individual video data stream to the current time, with respect to their individual presentation times. This becomes even more challenging if one needs to synchronize additional data streams to these live video data streams (e.g. live sport analytics data, or a separate audio stream). As each additional data stream is combined to the view, it requires additional end user-side/client-side synchronization calculations to keep all these data streams in synchronization.

It is an object of the present invention to provide a multi-stream data feed that can synchronise a variety of data feeds, irrespective of the start time of the data feeds and transmit the synchronised data feeds to a remote device (e.g. a video player) for display. More specifically, it is an object of this invention to provide a solution to time synchronizing the data streams at a remote devices, by determining a start reference time from a first data stream and then modify each data stream's presentation time to align with a common presentation time before transmitting the time synchronized data streams to a remote device for display. By doing so, the time synchronized data streams may be displayed by standard, unmodified video players.

SUMMARY OF THE INVENTION

According to the invention, there is provided a method of providing a time-synchronized multi-stream data transmission, which method includes the steps of:

provide a first recording or generating device for providing frames of a first data stream;

encoding the first data stream into packets, wherein each first data stream packet includes a presentation time and a predetermined number of first data stream frames;

providing a second recording or generating device for providing frames of a second data stream;

encoding the second data stream into packets, wherein each second data stream packet includes a presentation time and a predetermined number of second data stream frames;

transmitting the first and second data streams to a processing device;

associating a common start reference time with the first packet of the first and second data streams transmitted;

assigning a first stream start time to the first packet of the first data stream transmitted and a second stream start time to the first packet of the second data stream transmitted;

associating a first time offset from the start reference time and first data stream start time (either directly or indirectly) with each subsequent packet of the first data stream and associating a second time offset from the start reference time and second data stream start time (either directly or indirectly) with each subsequent packet of the second data stream;

time-aligning the first data stream packets with the second data stream packets using the first time offset associated with the first data stream and using the second time offset associated with the second data stream; and applying a common presentation time to the aligned first and second data stream packets, irrespective of the original presentation time of the first and second data streams.

Typically, the data streams comprise streams of video, audio or data (e.g. subtitle or analytics data).

Generally, the transmission includes a broadcast, e.g. a video, audio broadcast or multimedia (inclusive of data) transmission.

The start reference time may be a time of day stamp (e.g. 1 Mar. 2021 09 h 31 min 10 s 5 ms), a derivation thereof (e.g. an increment from a time of day stamp) or an arbitrary time that is selected.

Preferably, the time offset is determined with reference to increments or by comparing time of day stamps.

Typically, the processing device is a server.

Generally, the recording or generating device is a video recorder, a microphone or a device that generates data.

Optionally, the first and second recording or generating devices apply the time of day stamp or time offset to each packet during recording or data generation. Alternatively, the first and second recording or generating devices transmit the first and second data streams to a processing device and the processing device applies the time of day stamps or time offsets to the received first and second data stream packets upon receipt of the first and second data streams.

Preferably, the time of day stamp includes (without limitation) GPS time stamps, NTP server time stamps, manually created time stamps and the like.

Typically, the processing device time-aligns the first and second data stream packets and applies a common presentation time to the packets.

Generally, the processing device transmits the first and second data stream packets (with common presentation time) to remote devices (e.g. computers, TVs, smartphones) for display, which remote devices are able to process presentation time and not time of day time or time offset stamps.

Preferably, the start reference time is associated to the time of day stamp of the first packet of the first and second data streams transmitted.

The processing device may be a single processing device. Alternatively, the processing device could be first and second processing devices synchronized by the start reference time.

Optionally, the start reference time is synchronized with a second processing device that receives a third data stream, such that the second processing device can time align the third data stream with the first and second data streams.

BRIEF DESCRIPTION OF THE DRAWINGS

The invention will now be described in more detail, by way of example only, with reference to the accompanying drawings in which.

DESCRIPTION OF THE INVENTION

Figure 3:
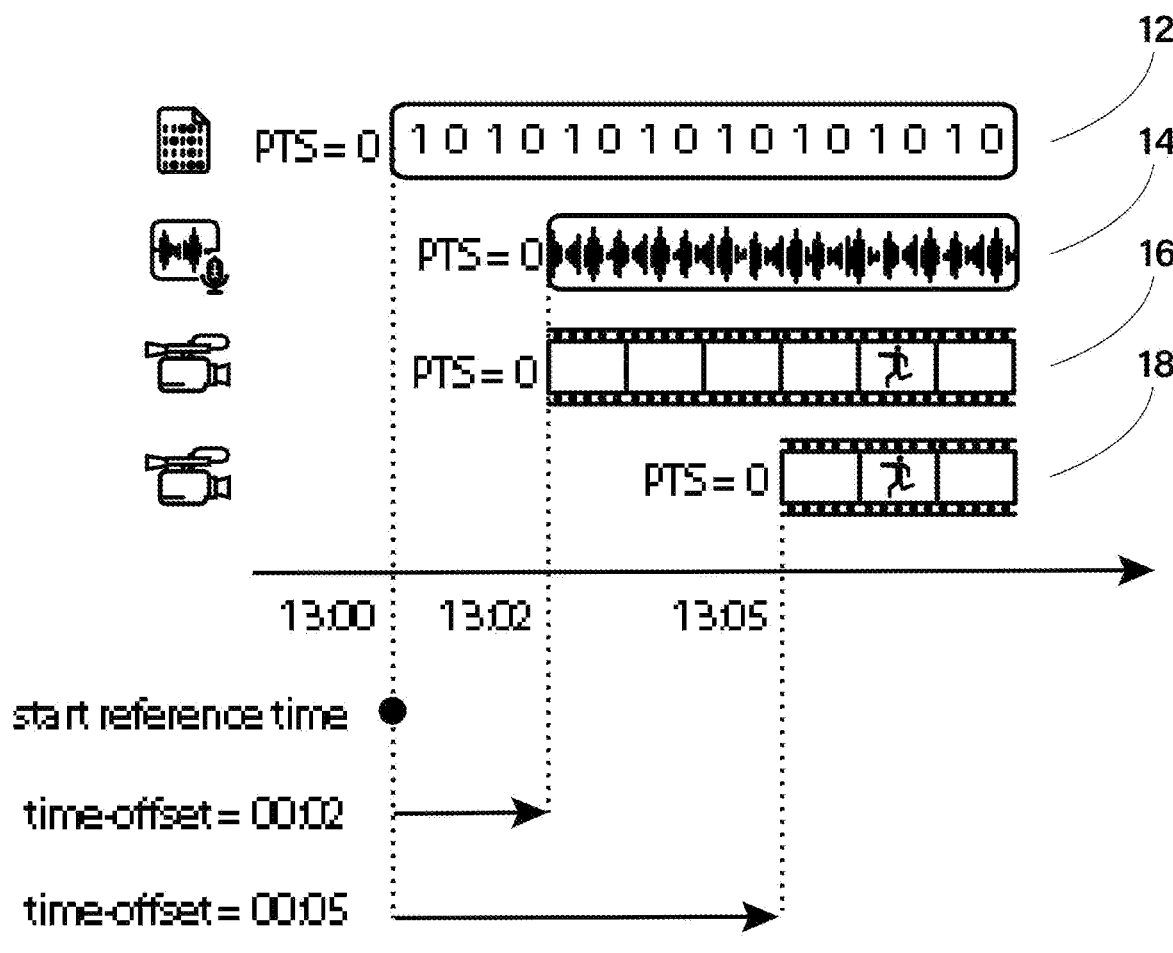
FIG. 3 is a schematic diagram of data feeds in FIG. 1, with the data feeds time-aligned using time offsets.
Figure 5:
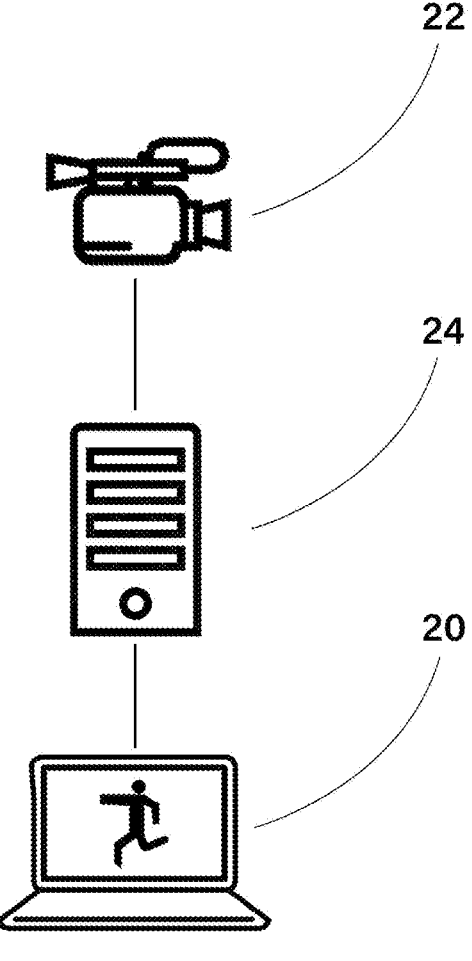
FIG. 5 is a schematic diagram showing hardware used to playback data feeds in FIG. 1.

With reference to FIGS. 3 and 5 of the drawings, a method of providing a time-synchronized multi-stream data transmission for transmitting a broadcast (e.g. a video broadcast, audio broadcast or multimedia (inclusive of data) transmission) utilises a system that includes:

a first recording or generating device 22 (e.g. a video recorder, a microphone or a device that generates data);

a second recording or generating device 24 (e.g. a video recorder, a microphone or a device that generates data); and a processing device 26 (e.g. a server).

The first or second recording or generating device 22 is a device that generates a data stream 12, 14, 16 or 18. An example of such a device is a video encoder that captures frames from camera view angles and creates a data stream to transmit this content.

The method of providing a time-synchronized multi-stream data transmission according to the present invention includes the steps of:

1. providing the first recording or generating device 22 for providing frames of a first data stream 16;

The first data stream 16 could be video, audio or data (e.g. subtitle or analytics data).

2. encoding the first data stream 16 into packets, wherein each first data stream packet includes a presentation time and a predetermined number of first data stream frames;

A "frame" is a sample of data of either a single picture within a video stream or samples of audio or other data that are sampled or captured in a predetermined manner. The sampling rate is usually described by "frames per second" for video and "samples per second" for audio and other data. For example, a video camera produces frames, at a predetermined number of frames per second.

"Encoding" is the method of taking frames and describing the frames with additional information, including presentation time, and to pack/encode the frames in to packets for transmission. Encoding using common encoding formats (such as MP4, RTMP, etc.) allows common playback devices to unpack/decode the packets in to frames for playback to the end user.

"Packets" are produced by encoding. A packet contains a frame or frames of sample data and additional information to describe the sample data, such as the presentation time.

"Presentation time" is a timestamp contained inside each packet to describe the time at which to present the video, audio or data, included in the packet, to the end user. Presentation time is typically an absolute time elapsed since the start of the data stream, meaning the presentation time at the start of the stream is typically zero and increments like a stopwatch for every packet in the stream. The presentation time is a representation of the time at which the frame was sampled by the recording or generating device.

3. providing the second recording or generating device 22 for providing frames of a second data stream 18;

Similarly, the second data stream 18 could be video, audio or data (e.g. subtitle or analytics data).

4. encoding the second data stream 18 into packets, wherein each second data stream packet includes a presentation time and a predetermined number of second data stream frames;

5. transmitting the first and second data streams 16 and 18 to the processing device 24;

The "processing device" 24 can include, but is not limited to, a central server, distributed server or computing device (such as a camera phone). The processing device 24 can also be the same device as the recording or generating device.

6. associating a common start reference time (i.e. the same start reference time) with the first packet of the first and second data streams 16 and 18 transmitted;

For example, when a first or second data stream 16 or 18 is initiated, a start reference time may be set to the time of day stamp (e.g. 1 Mar. 2021 09 h 31 min 10 s 5 ms) of the first packet of such first or second data stream 16 or 18 transmitted. Alternatively, instead of setting the start reference to the time of day stamp, the start reference time may be set to a derivation thereof (e.g. an increment from a time of day stamp) or an arbitrary time that is selected.

The time of day stamp may also include (without limitation) GPS time stamps, NTP server time stamps, manually created time stamps and the like.

7. assigning a first stream start time to the first packet of the first data stream 16 transmitted and a second stream start time to the first packet of the second data stream 18 transmitted;

The "stream start time" is the time at which a stream started, which can be determined by time of day or measured as the relative time elapsed since the start reference time. The stream start time can be determined by the recording or generating device. Alternatively, the stream start time can be determined by the processing device on receipt of the first packet of the stream. Further alternatively, the stream start time can be determined by interaction between the recording or generating device and the processing device.

8. associating a first time offset from the start reference time and first data stream 16 start time (either directly or indirectly) with each subsequent packet of the first data stream 16 and associating a second time offset from the start reference time and second data stream 18 start time (either directly or indirectly) with each subsequent packet of the second data stream 18;

The "time offset" is the time difference determined between the stream start time of a data stream and the start reference time. It may be determined with reference to increments or by comparing time of day stamps.

Optionally, the first and second recording or generating devices 22 apply the time of day stamp or time offset to each packet during recording or data generation.

Alternatively, the first and second recording or generating devices 22 transmit the first and second data streams to the processing device 24 and the processing device 24 applies the time of day stamps or time offsets to the received first and second data stream packets upon receipt of the first and second data streams 16 and 18.

Preferably, the time offset with respect to the start reference time and the relevant stream start time is determined by the processing device 24.

9. time-aligning the first data stream 16 packets with the second data stream 18 packets using the first time offset associated with the first data stream 16 and using the second time offset associated with the second data stream 18; and Each packet of the first and second data streams 16 and 18 has an "original presentation time" (i.e. its inherent presentation time before time-aligning). This is the presentation time originally determined by the recording or generating device 22.

"Time-aligning" is the method of adjusting the original presentation time of a second data stream packet by adding the calculated time offset to the original presentation time in order to time-align such second data stream packet with a contemporaneous first data stream packet.

Time-alignment of the original presentation time of the second data stream 18 packet is performed by the processing device 24.

10. applying a common presentation time to the aligned first and second data stream packets, irrespective of the original presentation time of the first and second data streams 16 and 18.

The "common presentation time" could simply be the result of adding a data stream packet's original presentation time to the time offset.

The "common presentation time" replaces the original presentation time of the time-aligned first and second data stream packets This allows the time-aligned first and second data stream 16 and 18 packets to be time synchronized with other data stream 12 and 14 packets.

Replacement of the original presentation time by the common presentation time is performed by the processing device 24.

The method of providing a time-synchronized multi-stream data transmission typically includes the further step of transmitting (by the processing device) the first and second data stream packets (with common presentation time) to remote devices 20 (e.g. computers, TVs, smartphones) for display, which remote devices 20 are able to process presentation time and not time of day time or time offset stamps.

"Transmitting" is intended to mean the distribution of data streams. For example, a video data stream transmission would comprise the distribution broadcast of video content to end users who view the video on their video players. A transmission could also include a data stream that is generated on a server and distributed to an end user.

It will be appreciated that the processing device 24 may be a single processing device. Alternatively, the processing device could be first and second processing devices synchronized by the start reference time.

Furthermore, the start reference time may be synchronized with a second processing device 24 that receives a third data stream, such that the second processing device can time align the third data stream with the first and second data streams 16 and 18.

The method of providing a time-synchronized multi-stream data transmission is described further below by way of an example:

A video broadcaster at a sport event would typically record a match using several cameras 22, each capturing game play from different viewing angles. These viewing angles are edited into a single broadcast video feed that is transmitted to end users, who may be watching the live video stream at home on their laptop or mobile devices 20.

The video broadcaster may wish to broadcast three different viewing angles as a multi-view broadcast stream, enabling viewers at home to change their viewing angle themselves, so that they can choose how to watch the match from the available video streams.

In this scenario, it is important and desirous to ensure that the video streams are time synchronized to ensure a good viewing experience by the end user.

Figure 1:
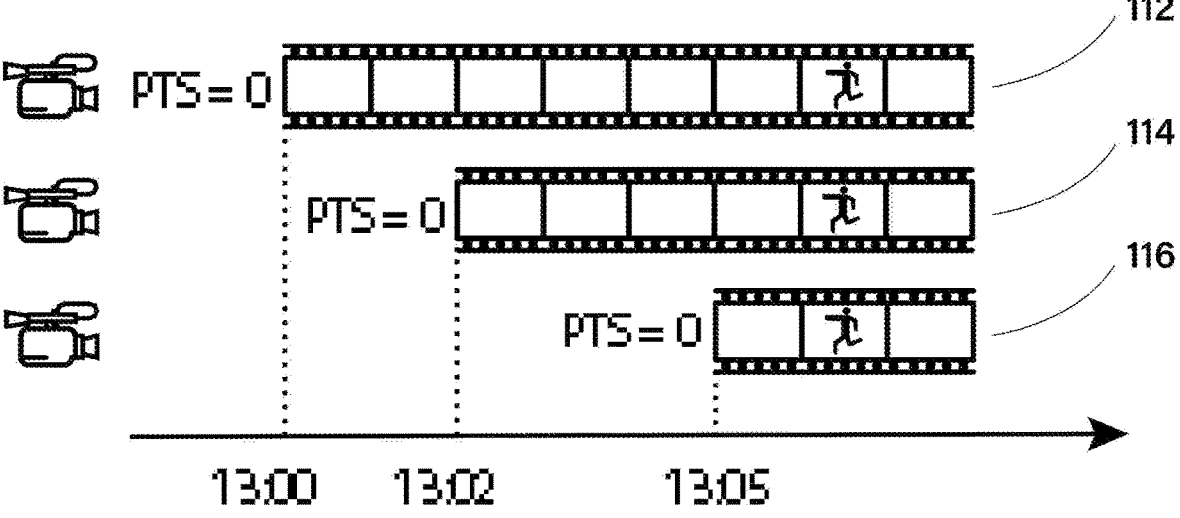
FIG. 1 is a schematic diagram showing time synchronised data feeds.

FIG. 1 shows time synchronized data feeds (not using the method according to the current invention). In this example, the first video data stream 112 begins streaming at 13:00, the second video data stream 114 begins at 13:02 and the third video data stream 116 begins at 13:05. A data stream presentation time can be likened to the start time of a stopwatch, initiated at the time that the data stream begins, starting at an absolute time of zero.

When each separate video feed begins streaming, their presentation times all begin at zero, even though their actual starting time of day is different and could be recorded in meta-data associated with the video stream.

Figure 2:
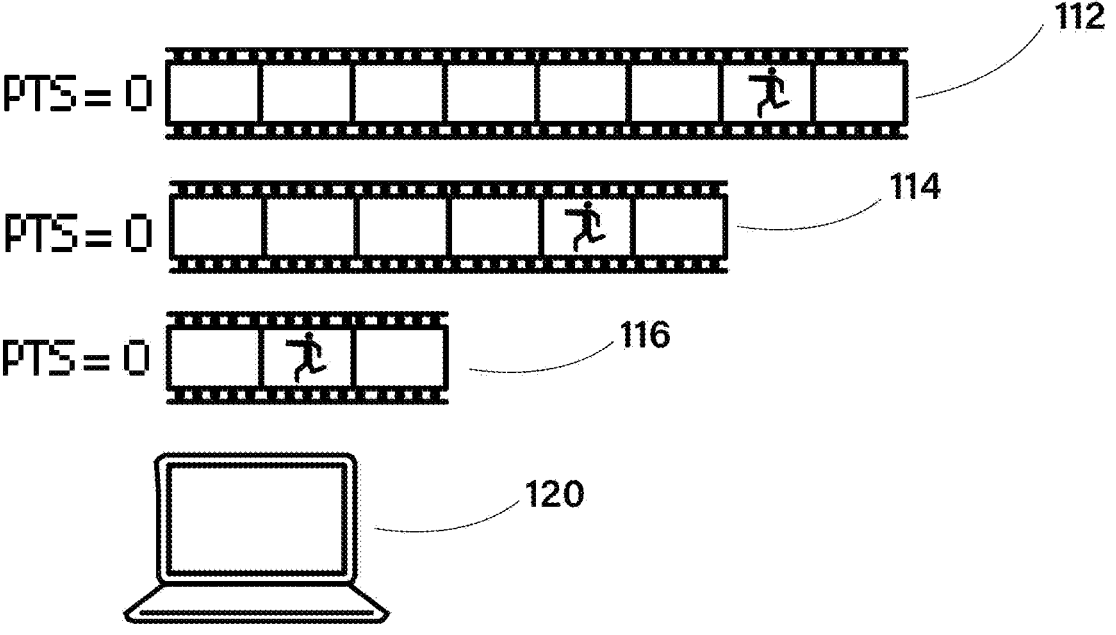
FIG. 2 is a schematic diagram of a playback of the data feeds in FIG. 1 according to their original presentation time (without time aligning the data feeds)

Without time-aligning, the video data streams 112, 114 and 116 would playback on a remote device 120 according to their original presentation time, resulting in an undesirable, un-synchronized playback of these video data streams on the remote device 120, as shown in FIG. 2.

To address the drawback of current video players 20 that play a video data stream based on the presentation time in the packets of that video data stream, the method according to the current invention processes the data stream as follows and as illustrated in FIG. 3:

When the first data stream 12 is initiated at 13:00, a start reference time is created and stored by the processing device 24.

When the first video data stream 16 and separate audio data stream 14 is initiated at 13:02, their packet presentation times are modified by a time offset of 00:02 as these latter video and audio data streams 16 and 14 are lagging the start reference time by 00:02.

When the second video data stream 18 is initiated at 13:05, its packet presentation times are modified by a time offset of 00:05.

Figure 4:
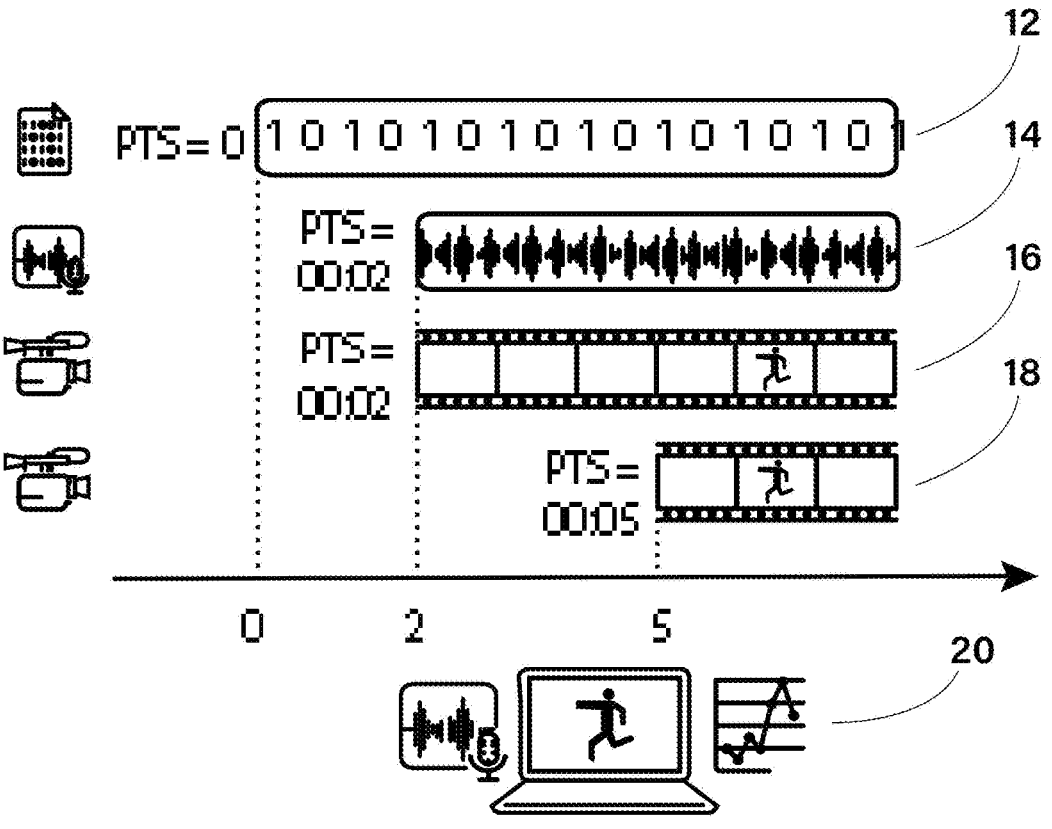
FIG. 4 is a schematic diagram of a playback of the data feeds in FIG. 3.

The result is that all data streams 12, 14, 16 and 18 (data, video and audio) are aligned to each other before they are distributed to the viewers' remote devices 20 (e.g. video players and related playback devices). Turning to FIG. 4, it will be appreciated that the viewers' remote devices 20 will not require additional client-side synchronization to play the multiple data streams 12, 14, 16 and 18 simultaneously, as the data streams 12, 14, 16 and 18 are synchronized on the processing device before distribution.

Turning to the start reference time and data stream start time:

The start reference time and data stream start times can be determined in several ways. Typically, they comprise a captured timestamp of the time of day. Alternatively, they could be captured as a timestamp from a free-running clock/timer that exists within most digital/computing devices. A free-running timer has no relation to time of day, but can serve as a reference point to determine the time offset between the start reference time, and the data stream start time. A few scenarios are described below.

Scenario 1—using times from a first packet of a first data stream:

When the processing device 24 receives the first packet of a first data stream, a timestamp is captured as the start reference time, which is the same as the first data stream start time. If captured using time of day, we will use an example of 13:00 as the start reference time. If captured using a free-running timer, a timer is started with a value of 00:00.

Start reference time (as time of day)=13:00
Start reference time (as timer)=00:00
First data stream start time (as time of day)=13:00
First data stream start time (as timer)=00:00
The time offset for the first data stream is 00:00 as the first data stream was considered the start reference time.

When the processing device 24 receives the first packet of a second stream, a timestamp is captured as the second data stream start time. If captured using time of day, we will use an example of 13:02 as the second data stream start time. If captured using a free-running timer, the timer that was started on receipt of the first packet of the first data stream has been ticking away and is now at a value of 00:02.

Second data stream start time (as time of day)=13:02
Second data stream start time (as timer)=00:02
The time offset for the second data stream is thus 00:02. This is calculated either by subtracting the difference in time of day, or by reading the value of the free-running timer.

Scenario 2—using times from a first packet of a second data stream:

The example detailed in Scenario 1 can apply vice versa when the second data stream is the first to arrive at the processing device and is used as the start reference time. Assuming the following times:

Start reference time (as time of day)=14:05
Start reference time (as timer)=00:00
Second data stream start time (as time of day)=14:05
Second data stream start time (as timer)=00:00
The time offset for the second data stream is 00:00 as the second data stream was considered the start reference time.

The first data stream then arrives later at the processing device 24.

First data stream start time (as time of day)=14:10
First data stream start time (as timer)=00:05
The time offset for the first data stream is thus 00:05. This is calculated either by subtracting the difference in time of day, or by reading the value of the free-running timer.

Scenario 3—using times from an arbitrary start reference time:

In this scenario, the start reference time is set to an arbitrary time, e.g. the time predetermined time that a transmission or broadcast is set to start. The start reference time is then set by instruction, which can be by human interaction or by computing instruction between computing devices in a "set the start reference time to now" fashion.

The start reference time is instructed to be "now", which happens to be a time of day of 15:00. Or a free-running timer is started at 00:00.

The first packet of a first data stream is captured at 15:02, or timer value 00:02. The first packet of a second data stream is captured at 15:08, or timer value 00:08.

Start reference time (as time of day)=15:00
Start reference time (as timer)=00:00
First data stream start time (as time of day)=15:02
First data stream start time (as timer)=00:02
Second data stream start time (as time of day)=15:08

Second data stream start time (as timer)=00:08
The time offset for the first data stream is thus 00:02. This is calculated either by subtracting the difference in time of day, or by reading the value of the free-running timer.

The time offset for the second data stream is thus 00:08. This is calculated either by subtracting the difference in time of day, or by reading the value of the free-running timer.

It will be appreciated that, by creating a start reference time and modifying all additional data stream packet presentation times to a common presentation time using a time offset to the start reference time, all data streams are kept time synchronized at the processing device 24. This has several advantages in applications such as multi-view broadcasting, where video data streams can be kept in synchronization to each other and to additional data streams (such as sport analytics data streams and audio streams), without the complexity of managing separate time offset clocks on the end user side/client side.

It will also be appreciated that the processing device could be included in a typical server environment, where multiple data streams are time aligned and distributed to end user applications for synchronized playback.

It will further be appreciated that, with distributed computing, the start reference time can be synchronized across multiple processing devices in different geographic locations, each with their own separate data streams. This would be advantageous in situations where one needs to combine audio, video and data streams from different geographically dispersed regions in a time synchronized manner.

The invention claimed is:

1. A method of providing a time-synchronized multi-stream data transmission, which method includes the steps of:

providing a first recording or generating device for providing frames of a first data stream;

encoding the first data stream into packets, wherein each first data stream packet includes a presentation time and a predetermined number of first data stream frames;

providing a second recording or generating device for providing frames of a second data stream;

encoding the second data stream into packets, wherein each second data stream packet includes a presentation time and a predetermined number of second data stream frames;

transmitting the first and second data streams to a processing device;

associating a start reference time with the first packet of the first and second data streams transmitted;

assigning a first stream start time to the first packet of the first data stream transmitted and a second stream start time to the first packet of the second data stream transmitted;

associating a first time offset from the start reference time and first data stream start time with each subsequent packet of the first data stream and associating a second time offset from the start reference time and second data stream start time with each subsequent packet of the second data stream;

at the processing device, time-aligning the first data stream packets with the second data stream packets using the first time offset associated with the first data stream and using the second time offset associated with the second data stream;

at the processing device, applying a common presentation time to the aligned first and second data stream packets, irrespective of the original presentation time of the first and second data streams, thereby modifying values of the presentation times within the first and second data stream packets; and distributing the first and second data stream packets containing the common presentation time from the processing device to a remote device for display, wherein the remote device is capable of processing the common presentation time contained within the distributed first and second data stream packets.

2. The method according to claim 1, wherein the first and second data streams comprise streams of video, audio or data.

3. The method according to claim 2, wherein the transmission includes a broadcast.

4. The method according to claim 3, wherein the start reference is: a time of day stamp; a derivation thereof; or an arbitrary time that is selected.

5. The method according to claim 4, wherein the time offset is determined: with reference to increments; or by comparing time of day stamps.

6. The method according to claim 4, wherein the processing device is a server.

7. The method according to claim 6, wherein the recording or generating device is a video recorder, a microphone or a device that generates data.

8. The method according to claim 7, wherein the first and second recording or generating devices apply the time of day stamp or time offset to each packet during recording or data generation.

9. The method according to claim 7, wherein the first and second recording or generating devices transmit the first and second data streams to the processing device and the processing device applies the time of day stamps or time offsets to the received first and second data stream packets upon receipt of the first and second data streams.

10. The method according to claim 9, wherein the time of day stamp includes at least one of GPS time stamps, NTP server time stamps, and manually created time stamps.

11. The method according to claim 10, wherein the remote device is not capable of processing-time of day time or time offset stamps.

12. The method according to claim 11, wherein the remote devices are computers, TVs or smartphones.

13. The method according to claim 12, wherein the start reference time is associated to the time of day stamp of the first packet of the first and second data streams transmitted.

14. The method according to claim 13, wherein the processing device is a single processing device.

15. The method according to claim 13, wherein the processing device comprises first and second processing devices synchronized by the start reference time.

16. The method according to claim 15, wherein the start reference time is synchronized with a second processing device that receives a third data stream, such that the second processing device can time align the third data stream with the first and second data streams.

\* \* \* \* \*